United States Patent

[11] 3,614,585

| [72] | Inventor | Kurt Wedin<br>Norrviken, Sweden |
|---|---|---|
| [21] | Appl. No. | 884,979 |
| [22] | Filed | Dec. 15, 1969 |
| [45] | Patented | Oct. 19, 1971 |
| [73] | Assignee | Allmanna Svenska Elektriska Aktiebolaget<br>Vasteras, Sweden |
| [32] | Priority | Dec. 16, 1968 |
| [33] | | Sweden |
| [31] | | 17173/68 |

[54] CENTRAL POWER PLANT FOR FEEDING DC POWER TRANSMISSION PLANT
5 Claims, 13 Drawing Figs.

[52] U.S. Cl. ................................................ 321/2, 321/18
[51] Int. Cl. ................................................ H02m 5/40
[50] Field of Search ................................... 321/2, 18

[56] References Cited
UNITED STATES PATENTS
2,208,182 7/1940 Elder ........................... 321/21
3,339,083 8/1967 Uhlmann ..................... 307/83
3,526,779 9/1970 Uhlmann ..................... 307/20

Primary Examiner—William M. Shoop, Jr.
Attorney—Jennings Bailey, Jr.

ABSTRACT: A power station is provided with a power machine driving an AC generator for feeding an HVDC power transmission plant, comprising a rectifier station in the power station and an inverter station at the other end of an HVDC line connected to the rectifier station. The power machine is controlled from a machine regulator to provide a desired rotational speed, while the converter stations of the HVDC transmission plant are controlled from a converter regulator to maintain a desired transmission magnitude. The machine regulator and the converter regulator are mutually connected and coordinated so that, in the first place, a change in the state of control of the HVDC plant is fed to the input of the machine regulator and, in the next place, a deviation between the state of control of the power machine and the actual number of turns of this machine influences the converter regulator so that the state of control of the converters is temporarily adapted to that of the power machine.

PATENTED OCT 19 1971 3,614,585

INVENTOR.
KURT WEDIN

BY
Jennings Bailey J 3,614,585

CENTRAL POWER PLANT FOR FEEDING DC POWER TRANSMISSION PLANT

BACKGROUND OF THE INVENTION

1. Field of the Invention

The present invention relates to a power station comprising a power machine for driving an AC generator feeding a DC power transmission system, comprising a rectifier station and an inverter station, connected over a DC transmission line, the power machine being controlled by a machine regulator with respect to a certain desired number of turns, while the DC power transmission system is controlled by a control regulator with respect to a certain desired transmission magnitude.

2. The Prior Art

The invention relates to the control of the two regulators of the power station, separately and in relation to each other, particularly if the DC power transmission system is the most essential part of the load of the power station. This is, for instance, the case when a power station of considerable size in a sparsely populated area is intended to provide a distantly situated consumer area with power over a DC power transmission system. In this case the regulator of the power machine must follow the control regulator of the DC power transmission system, which may involve great problems because of different characteristics of the two regulators.

The regulator of the DC power transmission system in this case is to be regarded as a very rapid regulator, as, for instance, a change in the power demand can be carried out in a period or two of the feeding AC voltage.

Compared to this, the regulator of the power machine is very slow, because of the relatively low maximum permissible rate of change of machine regulator. When, for instance, it is a question of steam turbines, a small regulatory change can be made rather quickly, while greater changes require a very long time. In water turbines, the flow in the water channels must not be changed too rapidly in order to avoid dangerous changes of the pressure. Therefore the speed of operation of the turbine regulator is always strictly limited by special limiting means.

Besides, the regulators of the power machines normally are controlled by the r.p.m. and thus a change in the demand for power from the DC transmission system first has to give rise to a changed r.p.m. of the generator as well as of the power machine before the machine regulator can give a response.

This cycle takes a certain time and further time passes before the machine regulator reaches its maximum permissible speed.

In pure AC networks, where the load is frequency dependent, that is, proportional to the frequency, a deviation of the frequency will correspond to a change of the load, which facilitates the work of the machine regulator. In a DC transmission system, however, the characteristics of the regulators of the converters are quite independent of the frequency of the feeding network—at least within certain limits—so that the regulators maintain a constant power output despite a changed frequency. Thus, an increase of the power demand of the DC transmission system will result in an increase of direct voltage of the rectifier station, resulting in an increase of the generator load and a reduction of the frequency. Because of this the driving moment and the frequency are further reduced. The rectifier, however, continues to draw off the increased demand of power and the turbine turns more and more slowly until its regulator reaches the increased power tapping. Only then can the turbine regain its normal r.p.m. Contrarily, a reduced power tapping of the DC transmission system will result in an increase of the r.p.m. of the generator and the power machine, which now will have a tendency to race.

SUMMARY OF THE INVENTION

The concept of the invention now is to adapt both regulators of the power station in relation to each other so that, on the one hand, when a change occurs in the control order of the rectifier, the change in the regulator input of the power machine is accelerated, while, on the other hand, the regulator output of the rectifier station is dampened so that the resulting regulating speed for the whole power station becomes as high as possible while at the same time the limits dictated by security reasons are respected.

According to the invention it is therefore desirable that a modified control order for the DC power transmission system is fed as soon as possible to the regulator of the power machine, directly or indirectly, and that the control order for the converters is made frequency dependent; thus making the load characteristic of the DC power transmission system frequency dependent, like a pure AC load. A power station according to the invention will therefore be equipped with a control system according to the ensuing description.

The influence on the regulator of the power machine can be made directly by supplying a modified control order not only to the power transmission system but also to the machine regulator, or indirectly, by making the change of the control order of the power transmission system according to such a program that a certain deviation of the frequency is rapidly achieved, which frequency deviation influences the machine regulator. Such a program may then consist of a momentary step in the order to the converter regulator followed by a predetermined program for the final completion of the order. As an extreme case, such a program consists of supplying the full amount of the modified control order to the converter regulator and thereafter reducing this magnitude by a strongly frequency dependent order.

BRIEF DESCRIPTION OF THE DRAWINGS

The invention will be further described with relation to the attached drawings, wherein.

DESCRIPTION OF THE PREFERRED EMBODIMENTS

Figure 1:
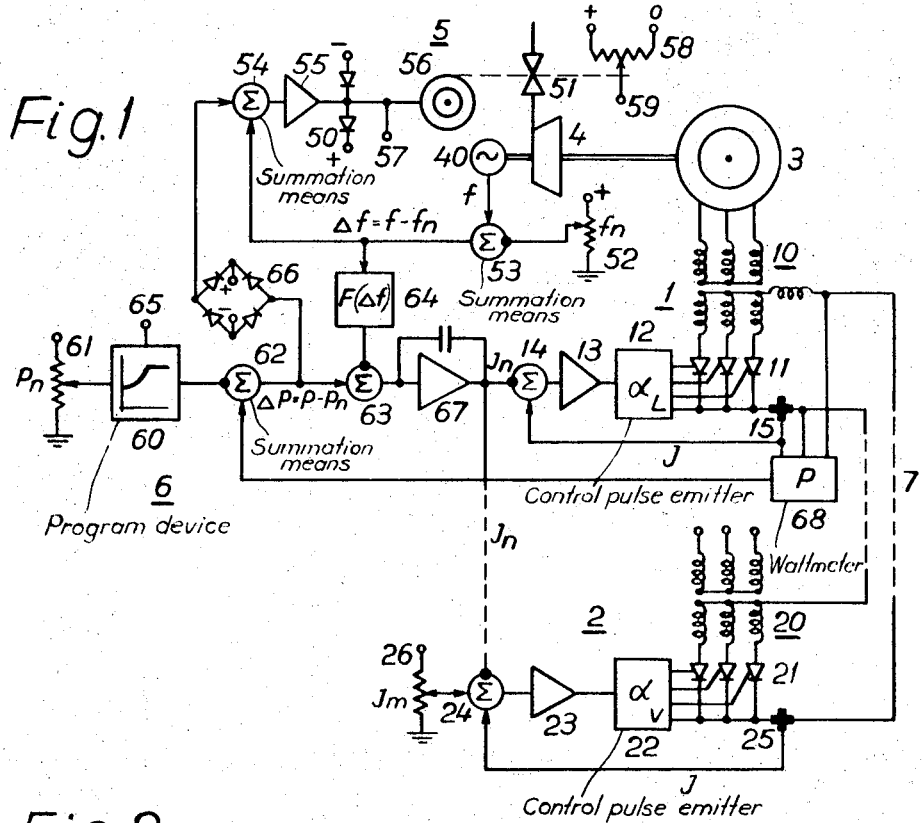
FIG. 1 shows a power station according to the invention.

FIG. 1 shows a DC power transmission system comprising a rectifier station 1 and inverter station 2 connected over a DC line 7. In FIG. 1 only one static converter is shown for each station, while, normally, there are several series-connected converters in each station. The rectifier 1 is fed over its transformer 10 from an AC generator 3, driven by a turbine 4, while the inverter 2 feeds an AC network, not shown, over its transformer 20. Each rectifier is provided with a valve group, 11 or 21 respectively, controlled by a control pulse generator 12 or 22, respectively, emitting control pulses to the valves with a certain delay angle $\alpha$ which is in its turn is determined by the output magnitude from the regulator amplifier 13 or 23, respectively. These regulator amplifiers are provided on the input side with a summation member 14 or 24, respectively.

To these summation members are connected the value I of the direct current, as measured by a measuring transducer 15 or 25, respectively in each station, and also a reference value—the desired value $I_n$—for the direct current, the actual value and desired value being connected with different signs. Further, in the inverter station 2 a potentiometer 26 is connected to the member 24, so that a so-called current margin $Im$ is subtracted from the desired value $In$ of the current.

The summation members of the input sides of the different amplifiers are simply constructed as parallel or series connecting means for electrical magnitudes. The signs (arrows and rings) on the inputs of the summation members refer to the sign or polarity of the input, an arrow corresponding to positive sign or polarity, while a ring corresponds to negative sign or polarity.

The reference value $In$, being common for both stations, is derived by means of a regulating circuit in dependence on a certain desired transmission magnitude, which, according to the example shown in FIG. 1, consists of the transmitted DC power P. The regulating circuit 6, suitably arranged at the rectifier station, is directly connected to the regulator amplifier 13 of one station, while its output signal is fed over a teleconnection to the regulator amplifier 23 of the second station.

Thus, the DC power transmission system is controlled according to the known current margin principle, that is, each station separately tries to maintain its resulting current order $In$ or $In-Im$ by adjusting its delay angle $\alpha$ and thus also its inner DC voltage which is proportional to cos $\alpha$.

When starting from, for instance, a DC value I, which lies between the current order $In$ of the rectifier and the current order $In-Im$ of the inverter, the input signal becomes $I-In$ in the regulator amplifier 13 of the rectifier and $I+Im-In$ in the regulator amplifier 23 of the inverter. These input signals are converted to output signals in the regulator amplifiers, the output signal normally being limited upwards in the regulator amplifiers to a maximum value corresponding to a minimum delay angle $\alpha$ involving rectifier operation and downwards to the value zero corresponding to maximum delay angle $\alpha$, corresponding to the inverter operation, and because of the current margin each station goes in its own direction until balance is achieved. The transmitted direct current becomes equal to $In$ or $In-Im$, depending on whether it is the rectifier station or the inverter station which has the greatest voltage resources on the alternating current side.

The reference magnitude for the DC current transmission is, as mentioned, derived by means of the regulating circuit 6, for instance, as shown with relation to a certain transmitted DC power P, measured by a wattmeter 68 of any design, for example a Hall generator. Instead of transmitted DC power, it is possible to choose the direct current, the frequency in the receiving AC network or any other transmission magnitude. The desired value, $Pn$, for the DC power is set on a potentiometer 61. The potentiometer 61 and the wattmeter 68 are connected with opposite signs to a summation member 62, from the output of which the difference $\Delta P+P-Pn$ is connected to the regulator amplifier 67 for the DC power transmission system. In the first consideration, the members 60 and 63–66 are disregarded. The amplifier 67 can be of an integrating type as indicated by the capacitive feedback connection, which means that it keeps it output signal as long as the transmitted power $P$ is equal to the set value $Pn$, while the output signal and thus the reference value for 13 and 23 are changed, if, for example, the power adjustment $Pn$ is changed.

The generator 3 is, as mentioned, driven by a turbine 4, controlled by its regulator 5 in dependence on the number of revolutions measured by a tachometer generator 40 on the turbine shaft. A desired number of revolutions $fn$ corresponding to the rated frequency of the generator 3 is set on a potentiometer 52 and the actual value $f$ and the desired value $fn$ are connected with opposite signs to a summation member 53 from which a possible deviation $\Delta f$ of the number of revolutions is fed over another summation member 54 to the regulator amplifier 55. The output voltage of this amplifier controls a motor 56, which operates the turbine regulator in the form of a valve 51. As mentioned earlier, the rate of a change of the turbine regulator must be held within certain limits so that the output voltage from the amplifier 55 has to be limited by the limit means 50, which has been symbolically shown as two biased diodes. Thus, its output voltage can never exceed or be less than the biased voltages of these diodes, the motor speed thus being limited. Instead of a limitation of the control voltage, a purely mechanical limitation could be used. The state of the machine regulator can be sensed on the output 59 from a potentiometer 58 connected to the motor 56.

If the power order $Pn$ for the DC transmission is changed, for instance is increased, the direct voltage of the rectifier is increased, which results in a heavier load on the generator 3. Thus, its speed of rotation decreases so that a negative deviation $\Delta f$ of the speed of rotation occurs, which is fed to the amplifier 55 which in turn, influences the motor 56, resulting in an opening of the regulator valve 51 until the turbine power reaches the set DC power. If no special measures are taken, this will take a certain amount of time during which the DC transmission draws off the ordered power so that the rotational speed and thus also the generator frequency meanwhile decrease rather much.

Figure 2:
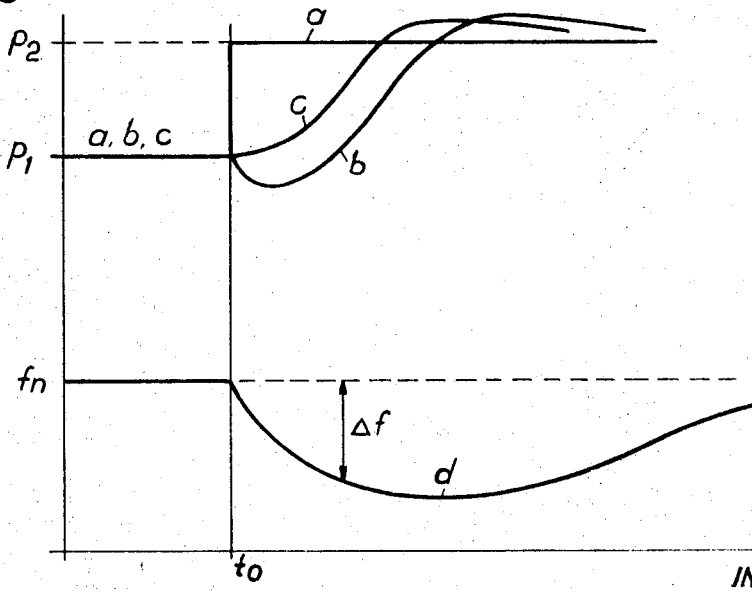
FIGS. 2 and 3 are diagrams showing the transmission magnitudes and control magnitudes of the plant.

The course hitherto described, which is quite conventional, is seen from the curves in FIG. 2, where the curve a indicates the set DC power, which at the time to is increased from P1 to P2. The rotational speed which up to the time $t_0$ was equivalent to the nominal frequency $fn$, is thereafter reduced according to curve $d$ by the amount $\Delta f$. As a consequence, the opening of the turbine regulator valve is increased according to the curve $c$, that is, in the beginning with the time derivative zero and thereafter with increasing time derivatives up to the maximum time derivative dictated by the limit means 50. The turbine power according to curve $b$ first shows a rapid falling tendency and it is not until the turbine regulator valve has been opened to a certain degree that the turbine power is increased. The rotational speed and thus also the frequency continue to decrease, and the deviation of the frequency does not reach its maximum until the turbine power according to curve $b$ passes the DC power according to line $a$. Until a surplus of the turbine power has been achieved the desired rotational speed and the frequency cannot be restored.

In order to speed up this course, it is proposed according to the invention to speed up the change of the turbine regulator valve so that this is started as soon as possible and preferably with the maximum permissible time derivative. Regarding the curve $d$ in the desired case, this curve indicates an input signal for the turbine regulator and according to the invention it is proposed at the moment $t_0$ to obtain the greatest possible time derivative on this signal, if possible up to infinity.

This is achieved according to an embodiment of the invention by connecting the signal $\Delta P$ from the member 62, which indicates the deviation of power of DC transmission, directly to the summation member 54 on the input of the turbine regulator and with the same sign as the deviation $\Delta f$ of the speed of rotation. Thus, momentarily an input signal is obtained for the turbine which starts as shown on the curve $c$ in FIG. 3, that is, with the maximum permissible time derivative. As a consequence of this fact the turbine power will increase according to the curve $b$ in FIG. 3 —which occurs considerably faster than according to FIG. 2 —and the deviation of the frequency according to the curve $d$ becomes considerably smaller. According to this embodiment an additional signal to the turbine regulator is obtained.

Since the DC power order has been changed by the regulators 13 and 23 of the rectifiers, the signal $\Delta P$ to 54 disappears; meanwhile, however, the deviation of the frequency has achieved such a magnitude that it can increase the opening of the turbine regulator valve to the desired value.

With regard to stability, it is neither desirable nor necessary that smaller changes in the transmitted power should influence the turbine regulator. A threshold value means 66 is therefore connected between 62 and 54 in the form of a biased rectifier bridge. Only if the change in the power order $\Delta P$ is greater than the bias voltage in 66 will a direct signal be fed to 54. In the same way this signal disappears when the transmitted DC power approaches the set DC power value, which is desirable, as the signals must be cancelled at the latest when the deviation of frequency passes its maximum.

Despite the direct transmission of the signal from 62 to 54, the speed of the machine regulator 5 still will be considerably less than the speed of the converter regulator 6 it may therefore be desirable to modify the converter regulation 6 so that its speed better agrees with the speed of the machine regulator 5 and so that the deviation of the turbine power and thus also of the speed of rotation and frequency will be kept within reasonable limits. The first measure to be considered would be to insert some sort of delaying member between the potentiometer 61 and the member 62 so that a changed adjustment of 61 would be registered only slowly in the regulator amplifier 67. On the other hand, as mentioned, a quick start of the turbine regulator is desired, and this leads to another embodiment of the invention according to which a changed control order for the DC transmission is indirectly transmitted to the turbine regulator, that is, over the speed or frequency dependent input of the machine regulator according to a certain program, which means that the control order is made as a momentary step followed by a certain program for carrying out the remaining control order. Such a momentary step results in the first place in a great change of the frequency, thus starting the turbine regulator, after which the converter regulator is modified according to the predetermined program.

In its simplest form, as an extreme case, the momentary step consists of the total change of the control order, that is, according to FIG. 2. Simultaneously the control order is reduced in dependence on the deviation of the rotational speed or the frequency by means of the member 64, to the input side of which is connected the signal $\Delta f$ from 53, the output signal from 64 being a signal $F (\Delta f)$, which in the member 63, on the input side of the amplifier 67, is subtracted from the signal $\Delta P$ from 62.

Figure 4:
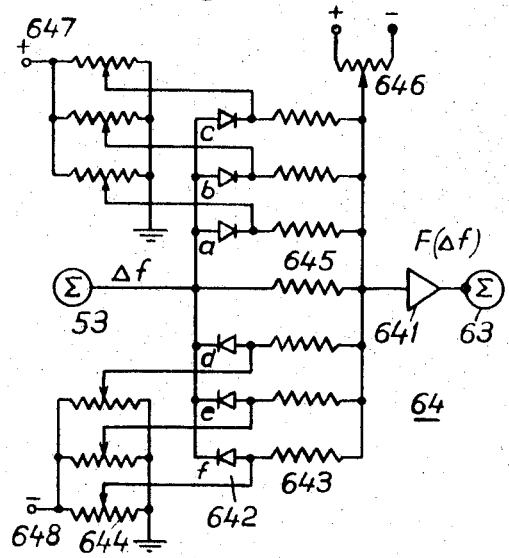
FIG. 4 shows the details of the circuit for reducing the control order.

The member 64 can be constructed according to FIG. 4, comprising an amplifier 641 connected between the members 53 and 63. The signal $\Delta f$ from 53 is connected to the amplifier 641 over a first input resistor 645 and a number of input circuits $a-f$ in parallel therewith, each input circuit comprising a valve 642 and a resistor 643. The valves are divided into two reverse-parallel-connected groups $a-c$ and $d-f$ and biased over corresponding potentiometers 644, which are set at different values, connected to a positive respectively a negative voltage source at the terminals 647 and 648. In order to compensate for the currents from 647 to 648 through the potentiometers 644 and the resistors 643, the input side of the amplifier 641 is connected to the output of a potentiometer 646 so that the input side of the amplifier 641 can be neutralized when the input signal $\Delta f$ is zero.

Figure 5:
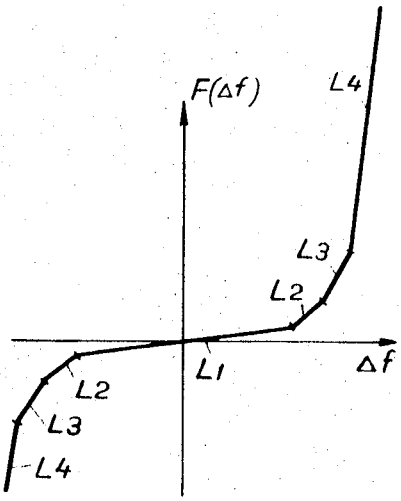
FIG. 5 is a chart showing the output of the device of FIG. 4.

The output voltage $F (\Delta f)$ of the amplifier 641, as a function of the input voltage $\Delta f$, consequently will have a curve shape as shown in FIG. 5. With low positive or negative values of $\Delta f$, all the valves $a-f$ are blocked by their bias voltages, and $F (\Delta f)$ becomes a linear function of $\Delta f$ corresponding to the line L1. If $\Delta f$ increases in a positive or a negative direction, the valve $a$ or $d$ first becomes conducting, and thus $\Delta f$ is connected to the input of the amplifier 641 over the resistor 645 and the corresponding resistor 643. $F (\Delta f)$ will thus follow the lines L2. During a continuous increase of $\Delta f$, the valve $b$ or $e$ and thereafter $c$ or $f$ becomes conducting and thus $F (\Delta f)$ follows the lines L3 and L4. Thus it is seen that the curve $F (\Delta f)$ will have a substantially parabolic shape.

As mentioned earlier, the signal from 64 will be subtracted from the signal from 62 in the member 63 so that the latter signal will be reduced by the magnitude $F (\Delta f)$. Small deviations in the frequency thus result in a moderate reduction of the signal from 62, while in case of great deviations said signal may be quite eliminated.

Furthermore it is seen that the upper and the lower half of the figure 4 do not have to be symmetrical. With relatively great load on the turbine regulator, a rather fast increase of the load of the station normally can be tolerated, while a reduction of the opening of the regulator valve must be carried out slowly to avoid a dangerous rise of pressure in the water channels to the turbine. This can be given consideration in the choice of the bias voltages on the valves 642, and the input resistors 643 in the upper and lower half of the circuits in FIG. 4. In this way the two branches of the parabolic curve in FIG. 5 become different, which, however, does not result in any principle difference in operation.

Figure 3:
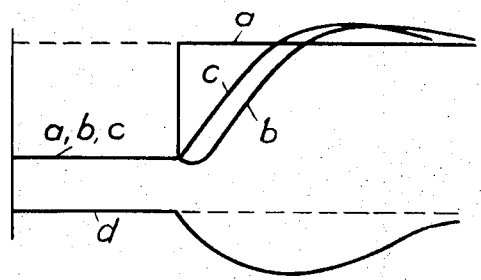
Figure 6:
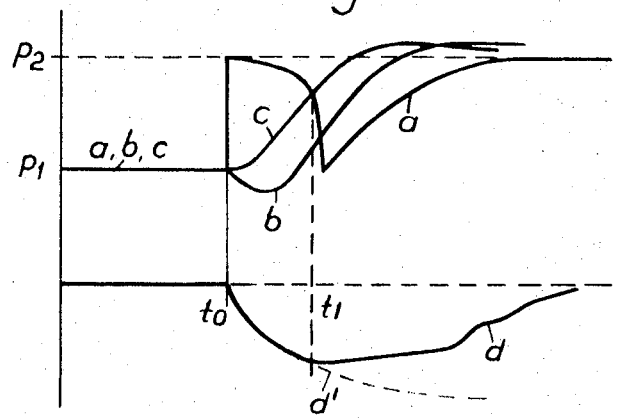
FIG. 6 is a diagram similar to that of FIGS. 2 and 3 showing the effect of the circuit of FIG. 4.

The result is seen from FIG. 6, where the curves $a, b, c$ and $d$ correspond to the same curves as in FIGS. 2 and 3. At the moment to the control order of the potentiometer 61 is momentarily increased from $P_1$ to $P_2$. The rotational speed of the turbine decreases rapidly according to the curve $d$ and the turbine regulator valve is opened according to the curve $c$. The control order from 63 to 67 according to curve $a$ will be reduced with increasing deviation of the frequency according to the function $F (\Delta f)$, see FIGS. 4 and 5. About the moment $t_1$, the deviation of the frequency passes the knee of the curve in FIG. 5, so that $F (\Delta f)$ follows the line L4, and the control order to 67 is reduced to its original value or thereabouts. It will thus be possible for the turbine to regain its lost power, and the deviation of the frequency is kept within reasonable limits, instead of following the broken line $d^1$ in FIG. 6, and further the frequency dependent control-order-reduction will gradually decrease so that the control of the DC transmission may be fulfilled.

As the time for the turbine to regain its normal speed is very dependent on the deviation of the frequency it is seen that the limited deviation of the frequency accelerates the fulfilling of the modified demand for power.

The total change of the control order, momentarily inserted, is, as mentioned, to be regarded as an extreme case, which in most cases presumably is too sharp. The same rigidity of the regulating course during easier conditions can be achieved if the momentary step in the control order is limited to a fraction, for example a third of the total change, and then is followed by a slower program. For this purpose a programming means 60 can be connected between 61 and 62, which programming means can be constructed according to any of figures 7 or 9–12.

Figure 7:
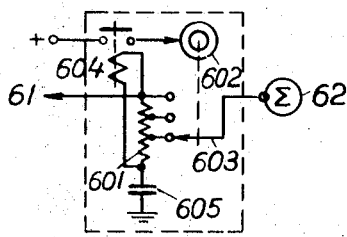
FIG. 7 shows the details of a programming means.

In FIG. 7, the programming means 60 comprises a potentiometer 601 which is connected over a capacitor 605 to the earth and to the potentiometer 61 and further provided with a number of outputs, which can be connected to the member 62 over a step-switch 603, driven by a servomotor 602. The servomotor 602 is driven by a voltage supplied over a contact in a relay 604, which in its turn is controlled by the voltage over 601. In case of a change of the control order of the DC power system on the potentiometer 61, this change will appear over the potentiometer 601 during recharging of the capacitor 605 and a part of this signal, for instance a third, will be connected over the lower output of the potentiometer directly to the members 62 and 63 and thus also to the regulator amplifier 67 resulting in the transmitted DC power being changed in relation thereto. At the same time the servomotor 602 is started by the relay 604 and, with a certain time delay, the signal to 62 is increased step by step until the whole change of the control order is carried out. When the capacitor has been charged, the voltage over 601 becomes zero and the relay drops and the control order is preserved in the regulator amplifier 67. The relay 604 must be a time relay so that it does not pick up until at least a part of the first control step has been effectuated by the regulator 5.

Figure 8:
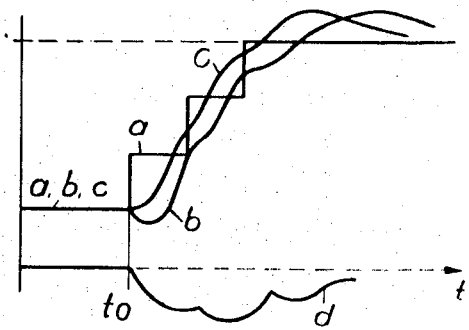
FIG. 8 is a chart similar to that of FIG. 6 showing the results of the circuit of FIG. 7.

The result is seen from FIG. 8, where the curves $a, b, c$ and $d$ correspond to the same curves as in FIGS. 2, 3 and 6. It is seen that the control order for the DC power grows up step by step according to curve $a$. Because of the first momentary step in the control order, the frequency curve $d$ will have a great negative time derivative at the moment $t_0$ as in FIG. 2, so that the turbine regulator is started rapidly according to curve $c$, resulting in a fast increase of the turbine power after a short decrease. It is seen that the turbine power, but not the speed of rotation, substantially reaches the DC power during each step. It is also seen that optimum regulating speed is achieved if the control speed of the step-switch 603 is such that the deviation of the rotational speed always corresponds to the maximum regulating speed determined by the limit means 50, shown in FIG. 1. In this way a maximum regulating speed is achieved at a minimum deviation of the frequency, which should be the ideal condition.

Further, it is seen that the capacitor 605 and the potentiometer 601 should be so adapted to each other that their common time constant to a great extent exceeds the time constant of the whole regulating system to secure the stepwise control course of the system.

Figure 9:
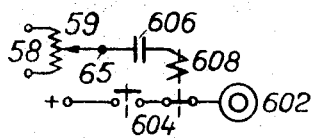
FIG. 9 shows a modified form of a programming device.

The above-mentioned optimum relation between regulator speed and deviation of frequency may be automatically achieved, if the servomotor 602 is controlled according to FIG. 9, which is a variant of FIG. 7. The potentiometer 601, the servomotor 602, the step-switch 603 and the relay 604 are connected according to FIG. 7. In series with the contact of relay 604, the contact of another relay 608 is arranged, which relay is controlled in relation to the regulator speed of the turbine. This is done in such a way that the output 59 from the potentiometer 58 in FIG. 1 is connected over the terminal 65 and the capacitor 606 to the control circuit for the relay 608. Thus, 608 will be controlled by the time derivative of the voltage of the output 59, so that 608 breaks its contact when this time derivative achieves a certain magnitude at a maximum regulator speed.

Thus the programming device according to FIG. 9 functions in the same way as according to FIG. 7, the only difference being that the step-switch is controlled by the regulator speed, that is, it is stopped as long as it is full regulator speed and started again when the regulator speed decreases. The curve shapes are the same as in FIG. 8 except that the length of steps may be varied.

Figure 10:
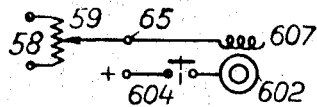
FIG. 10 shows a variation of the circuit of FIG. 7.

It is easy to realize that attention possibly also should be paid to the state of the regulation valve, that is, considerably greater variations may be permitted at a lower amount of load than at high load. This condition is considered in FIG. 10, showing a variant of FIG. 7, where the servomotor 602 is provided with a damping or brake winding 607, connected to the output 59 of the potentiometer 58. When the load is low, the voltage of 59 is low and therefore the servomotor runs relatively freely. Under heavy load the voltage of 59 is high and the speed of the step switch is reduced. The principles may be further developed so that the programmed speed is made dependent on the direction of the control order.

This is motivated by the fact that at heavy load an increase in the control order can be carried out relatively fast, while a reduction of the control order should be carried out slowly, as, for example, in case of water turbines, to avoid dangerous accelerations of the pressure the water flow may not be choked too rapidly, on the contrary, when the load is low, a relatively fast reduction may be permitted, while a rather long time is necessary to carry out an increase of the load.

Figure 11:
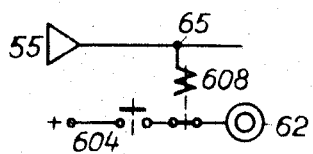
FIG. 11 shows a variation of the circuit of FIG. 9.

FIG. 11 shows another variant of FIG. 9, where the relay 608 is controlled directly from the regulator amplifier 55, the output voltage of which is a measure of the regulator speed. The curve shape for FIGS. 9–11 is the same as shown in FIG. 8.

Figure 12:
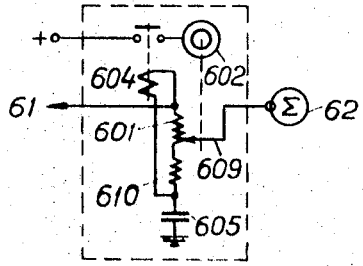
FIG. 12 shows a further form of programming device.

FIG. 12 shows a further variant of the programming device 60, where the potentiometer 601 is constructed with a continuously working output 609 and series connected with a resistor 610.

Figure 13:
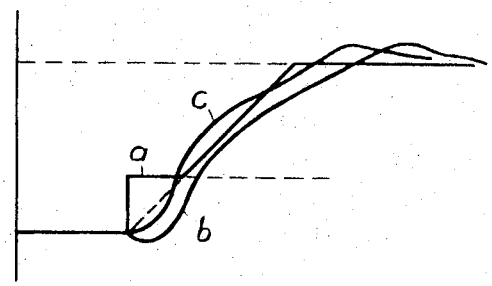
FIG. 13 is a chart showing effect of the circuit of FIG. 12.

The course of the program according to FIG. 12 is indicated in FIG. 13 and it is seen that the program involves a momentary change of the control order with a certain initial step and the completion with a certain time delay according to a linear function. This gives a very good agreement between the power, the state of the turbine regulator and the turbine power.

In the above, the different possibilities and variants of the invention have been described separately. However, it is clear that these different variants can be combined in different ways. Thus, the frequency-dependent correction from the member 64 generally is regarded as desirable. Further, the direct connection from 62 to 54 over the threshold value means 66 gives the greatest control speed without jeopardizing the stability. Which program should finally be chosen in the device 60 must be decided from case to case.

I claim:

1. In combination with having a power machine, an AC generator driven by said power machine, a rectifier station and an inverter station each including at least one converter, a DC transmission line connecting said rectifier and inverter stations, said generator feeding said rectifier station, a regulator connected to said power machine to control the rotational speed thereof, first means operatively connected to the power machine to furnish a first signal proportional to its rotational speed, second means to furnish a second signal proportional to the desired rotational speed, third means to combine said first and second signals into a third signal proportional to the difference therebetween, means to supply said third signal to said regulator, said regulator including fifth means responsive to said third signal, adjust said regulator in a direction to maintain the desired rotational speed, sixth means connected to one of said converters to regulate the transmission magnitude thereof, seventh means operatively connected to said converter to derive a fourth signal proportional to the transmission magnitude thereof, eighth means to furnish a fifth signal proportional to the desired transmission magnitude, ninth means to combine said fourth and fifth signals into a sixth signal proportional to the difference therebetween, 10th means to furnish said sixth signal to said transmission magnitude regulating means, said transmission magnitude regulating means including eleventh means responsive to said sixth signal to adjust said transmission magnitude regulating means in a direction to maintain the desired transmission magnitude, and 12th means to furnish said sixth signal to said regulator, said regulator including 13th means responsive to said sixth signal to accelerate the speed of regulation thereof.

2. In a combination as claimed in claim 1, 14th means connected to said 10th means to furnish said third signal thereto, said 10th means including 15th means to subtract said third signal from said sixth signal.

3. In a combination as claimed in claim 1, said eighth means including a program device, said program device including 16th means for supplying said sixth signal with a high-time derivative for a first period and thereafter with a lower time derivative for a second period.

4. In a combination as claimed in claim 3, said program device operating in successive steps.

5. In a combination as claimed in claim 4, said program device including time delay means for producing linear change during said second period.